Patented Aug. 28, 1951

2,565,550

UNITED STATES PATENT OFFICE

2,565,550

CATION-ACTIVE POLYCHLORIDE CONTAINING AN ESTERIFIED POLYAMINOETHER, AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application March 11, 1948, Serial No. 14,397. Divided and this application February 18, 1949, Serial No. 77,293

8 Claims. (Cl. 260—404.5)

Our invention relates to new chemical products or compounds and to the manufacture of same, our present application being a division of our co-pending application Serial No. 14,397, filed March 11, 1948, Patent No. 2,472,573, issued June 7, 1949.

One object of our invention is to provide a new chemical compound or product that is particularly adapted for use as a demulsifier for crude oil emulsions, but which is also capable of various other uses.

Another object of our invention is to provide a practicable method for manufacturing said new chemical product or compound.

The material, compound, product, or composition of matter herein described is a cation-active polychloride. Such cation-active polychlorides are obtained by reaction between an esterified monoamino alcohol or an esterified monoamino alcohol ether, as subsequently described, and diglycol chloroformate sometimes referred to as diethylene glycol bis (chloroformate), the formula for such compound being as follows:

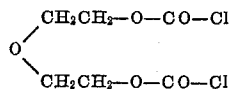

It is well known that triethanolamine can be esterified with higher fatty acids having 8 to 22 carbon atoms, for example, such as lauric acid, stearic acid, oleic acid, and the like, so as to yield a compound of the formula:

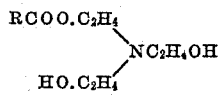

The product of esterified tertiary ethenolamines such as the esters of triethanolamine, ethyldiethanolamine, diethylethanolamine, etc., have been described in the literature, and particularly the patent literature. The best known examples are those of the following formula:

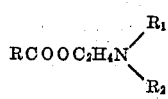

in which RCO is the acyl radical of the higher fatty acid having 8 to 22 carbon atoms, and $R_1$ and $R_2$ are selected from the class of alkyl radicals having not more than 4 carbon atoms (methyl, ethyl, propyl, or butyl) ethanol radicals, or ethanol radicals which have been treated with a mole of ethylene oxide or a mole of glycide.

If one reacts triethanolamine with 3, 2, and 1 mole of ethylene oxide, the following compounds are obtained:

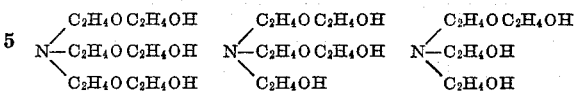

Similarly, if triethanolamine is treated with glycide, or if it is converted into the alcoholate and then treated with glycerolchlorhydrin, one then obtains compounds such as the following:

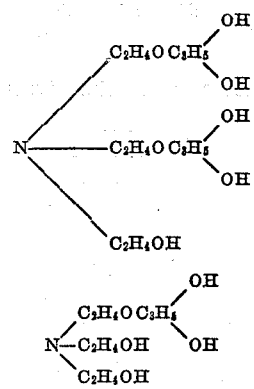

Actually, however, the usual procedure in forming the esters from tertiary amines such as triethanolamine, is to use the glyceride as a matter of economy. The alcoholysis reaction which takes place may be indicated in the following manner:

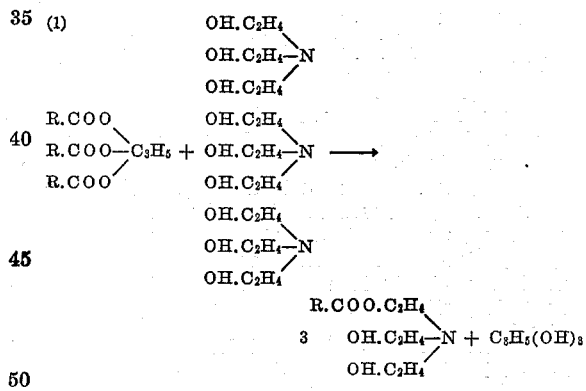

The temperature employed for such reaction is generally 175° or somewhat less, in order to avid etherization of the amino alcohol. Even so, the glycerol liberated from the glyceride may combine with the triethanolamine before acylation takes place. In any event, the final product may be in part an acylated monoamino ether alcohol. Such compound is identical with the one obtained by esterifying or acylating triethanolamine after first treating such an amine with glycide or the equivalent reaction previously described.

Recapitulating what has been said, it is to be noted that the acyl radical may be attached to the nitrogen atom through the radical which contains the ether linkage. Thus, in the broadest aspect, the acylated monoamino alcohols and the acylated monoamino alcohol ethers herein contemplated as a reactant for combination with diglycol chloroformate, may be indicated by the following formula:

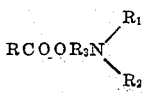

in which RCO is the acyl radical of a high molal monocarboxy acid, particularly a higher fatty acid, and especially, one having 8 to 22 carbon atoms. $R_1$ and $R_2$ are selected from the monovalent radicals

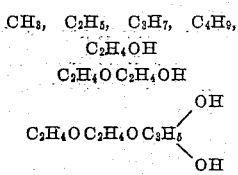

and $R_3$ is selected from the divalent radicals

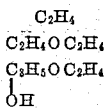

The expression "higher molecular weight carboxy acids" is an expression frequently employed to refer to certain organic acids, particularly monocarboxy acids, having more than 6 carbon atoms and generally less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids such as naphthenic acids, and carboxy acids produced by the oxidation of petroleum. As will be subsequently indicated, there are other acids which have somewhat similar characteristics and are derived from somewhat different sources, and are different in structure, but can be included in the broad generic term previously indicated.

Among sources of such acids may be mentioned straight chain and branched chain, saturated and unsaturated, carboxylic, aliphatic alicyclic, fatty, aromatic, hydroaromatic, and aralkyl acids including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least 8 carbon atoms, and including in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetyl-ricinoleic acid, linoleic acid, linolenic acid, lauric acid, myristic acid, undecylenic acid, palmitic acid, mixtures of any two or more of the above-mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil and other fish oils, teaseed oil, partially or completely hydrogenated animal and vegetable oils, such as those mentioned; hydroxy and alphahydroxy higher carboxylic, aliphatic and fatty acids, such as hydroxystearic acid, dihydroxypalmitic acid, dihydroxystearic acid, dihydroxybehenic acid, alphahydroxy capric acid, alphahydroxy stearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxydiphenyl, naphthenic, and abietic acid; aralkyl and aromatic acids, such as hexahydrobenzoic acid, hydrogenated naphthoic, hydrogenated poly - carboxy - diphenyl, naphthenic, and abietic acid; aralkyl and aromatic acids, such as benzoic acid. Twitchell fatty acids, naphthoic acid, carboxy-diphenyl, pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, etc.

Another source of suitable acids are those commonly referred to as lac acids, such, for example, as the acids derived from shellac. Such acids include various polyhydroxy acids, for example, aleuritic acid, shelloic acid, and kerrolic acid.

As is well known, one may use substituted acids in which some other non-functional constituent enters the structure of the fatty acid. For instance, one may use aryl-, hydroxy-, alkoxy-, keto and aminoderivatives. Generally speaking, however, it is always preferable to use the unsubstituted acid, particularly free from substituents which contain either oxygen or nitrogen atoms. Generally speaking, the introduction of hydrocarbon radicals, regardless of source, has little effect except in altering the hydrophile-hydrophobe balance.

One may also employ the blown or oxidized acids, such as blown ricinoleic acid, blown oleic, or estolides derived from blown oils, such as blown castor oil, blown soyabean oil, etc.

As previously stated, the acylated monoamino alcohols or the acylated monoamino alcohol ethers herein employed as reactants, are well known compounds and have been described frequently in the literature, particularly the patent literature. Our preference is to obtain them from higher fatty acids or higher fatty acid glycerides, and we particularly prefer to employ ricinoleic acid, oleic acid, linoleic acid, linolenic acid, stearic acid, or the glycerides which are a source of such fatty acids such as castor oil, neat's-foot oil, lard oil, soyabean oil, stearine, etc.

We have also found naphthenic acids, particularly those bearing a molecular weight from slightly above 200 to slightly less than 400, to be particularly desirable as reactants. We have also employed resin acids such as rosin, abietic acid, etc. Such compounds are obtainable in the manner described are are sometimes obtained conveniently by treating an acylated monoamino alcohol or acylated monoamino alcohol ether with one or two moles of ethylene oxide or glycide.

Such reactants, all of which are well known, may be exemplified by the following formulae, in which RCO is the acyl radical of a higher fatty acid of the kind described, or the acyl radical of the naphthenic acids, as described, or the acyl radical of a resin acid such as abietic acid, etc.:

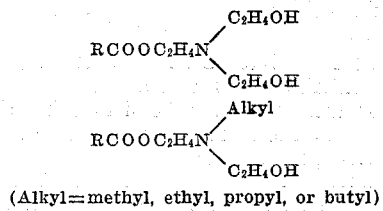

(Alkyl=methyl, ethyl, propyl, or butyl)

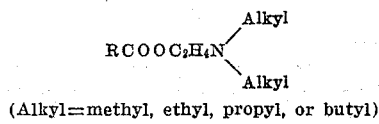

(Alkyl=methyl, ethyl, propyl, or butyl)

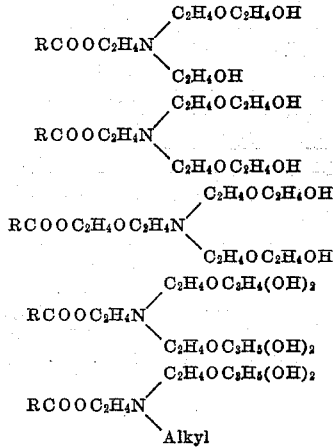

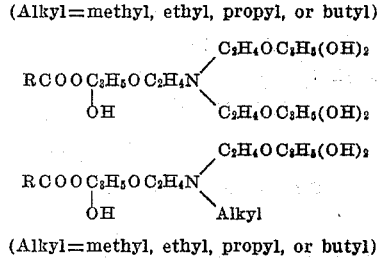

(Alkyl=methyl, ethyl, propyl, or butyl)

CATION-ACTIVE POLYCHLORIDE

Example 1

Two gram moles of the monoricinoleyl ester of triethanolamine (858 grams) is mixed with one gram mole of diglycol chloroformate (58 grams). The mixture was placed in a flask with a suitable stirring device and reflux condenser and heated at 160° to 180° C. for one hour. The mixture showed a tendency to foam when first warmed, but as soon as the reaction started, the foaming tendency decreased. The particular triethanolamine ester employed gave a cloudy solution in water. Diglycol chloroformate is, of course, water-insoluble. The resultant product was sufficiently soluble in water at the end of the reaction period to give a perfectly clear solution and showed a presence of chloride ions.

CATION-ACTIVE POLYCHLORIDE

Example 2

The same procedure was followed as in Example 1, preceding, except that two gram moles of the oleic acid ester (826 grams) was employed instead of two gram moles of the ricinoleic acid ester. In all other respects the procedure was identical with that described in Example 1.

CATION-ACTIVE POLYCHLORIDE

Example 3

The same procedure was followed as in Example 1, preceding, except that two gram moles of the stearic acid ester (830 grams) was employed instead of two gram moles of the ricinoleic acid ester. In all other respects the procedure was identical with that described in Example 1.

CATION-ACTIVE POLYCHLORIDE

Example 4

The same procedure was followed as in Example 1, preceding, except that two gram moles of the abietic acid ester (866 grams) was employed instead of two gram moles of the ricinoleic acid ester. In all other respects the procedure was identical with that described in Example 1.

CATION-ACTIVE POLYCHLORIDE

Example 5

The same procedure was followed as in Example 1, preceding, except that two gram moles of the naphthenic acid ester (712 grams) was employed instead of two gram moles of the ricinoleic acid ester. In all other respects the procedure was identical with that described in Example 1.

The naphthenic acid was obtained from a Gulf Coast crude and had a molecular weight of 225.

CATION-ACTIVE POLYCHLORIDE

Example 6

The same procedure was followed as in the five preceding examples, except that, instead of using the triethanolamine ester, there was employed the ester of monoethyldiethanolamine. For convenience, the weights employed are indicated by reference to the subsequent table. The table shows the molecular weights of the ester. As in Example 1, the amount employed was two gram moles in each instance.

CATION-ACTIVE POLYCHLORIDE

Example 7

The same procedure was followed as in the six preceding examples, except that, instead of using the triethanolamine ester, there was employed the ester of

For convenience, the weights employed are indicated by reference to the subsequent table. The table shows the molecular weights of the ester. As in Example 1, the amount employed was two gram moles in each instance.

CATION-ACTIVE POLYCHLORIDE

Example 8

The same procedure was followed as in the seven preceding examples, except that, instead of using the triethanolamine ester, there was employed the ester of

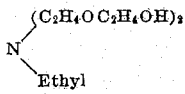

For convenience, the weights employed are indicated by reference to the subsequent table. The table shows the molecular weights of the ester. As in Example 1, the amount employed was two gram moles in each instance.

CATION-ACTIVE POLYCHLORIDE

Example 9

The same procedure was followed as in the eight preceding examples, except that, instead of using the triethanolamine ester, there was employed the ester of $$N[C_2H_4OC_3H_6(OH)_2]_3$$

For convenience, the weights employed are indicated by reference to the subsequent table. The table shows the molecular weights of the ester. As in Example 1, the amount employed was two gram moles in each instance.

CATION-ACTIVE POLYCHLORIDE

Example 10

The same procedure was followed as in the nine preceding examples, except that, instead of using the triethanolamine ester, there was employed the ester of

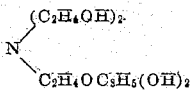

For convenience, the weights employed are indicated by reference to the subsequent table. The table shows the molecular weights of the ester. As in Example 1, the amount employed was two gram moles in each instance.

This type of acylated ester can be obtained by a number of procedures, two of which are as follows:

(1) Treat triethanolamine with one mole of glycide and then acylate.

(2) Prepare the acylated ester of triethanolamine and then treat with one mole of glycide. If this procedure is followed, the acyl radical is attached to the ethoxy radical. If the first procedure is followed, one may obtain a mixture of acylated derivatives in which part are characterized by attachment of the acyl radical to the ethoxy radical and part by attachment of the acyl radical to the ether radical.

For convenience, the following table is substituted:

Molecular weight mono-actyl derivative

| | Triethanolamine | Monoethyldiethanolamine | $N(C_2H_4OC_3H_6OH)_2$ | $(C_2H_4OC_2H_4OH)_2$ $N$ Ethyl | $N[C_2H_4OC_3H_6(OH)_2]_3$ | $C_2H_4OH$ $C_2H_4OC_3H_5$ OH OH $HOC_2H_4$ $N$ $HOC_2H_4$ |
|---|---|---|---|---|---|---|
| Ricinoleic | 429 | 413 | 561 | 457 | 651 | 503 |
| Oleic | 413 | 397 | 545 | 441 | 635 | 487 |
| Stearic | 415 | 399 | 547 | 443 | 637 | 489 |
| Abietic | 433 | 417 | 565 | 461 | 655 | 507 |
| Naphthenic from Gulf Coast Crude MW=225 | 356 | 340 | 488 | 384 | 578 | 430 |

It is obvious that, in some instances, the hydroxyl available for reaction with the diglycol chloroformate, may be furnished by the acyl radical of the mono-carboxy acid, as in the case of ricinoleic acid, hydroxystearic acid, dihydroxystearic acid, and other hydroxylated acids obtained by the action of hydrogen peroxide on unsaturated fatty acids including undecylenic acid.

In light of what has been said immediately preceding, it is obvious that the amine employed may also include types such as diethylethanolamine, dipropylethanolamine, dibutylethanolamine, and the comparable dialkyl derivatives of glyceramine. Similarly, an amine of the last mentioned type may be treated with one mole of ethylene oxide prior to acylation, or, inversely, the dialkyl ethanolamines may be treated with a mole of glycide or an equivalent reaction employed prior to acylation.

When prepared from the simplest and most readily available reactants, i. e., 18 carbon fatty acids and triethanolamine, the structures obtained are indicated by the following reaction and formula, assuming that, if the acyl radical has an alcoholic hydroxyl, reaction takes place preferentially at the ethanol hydroxyl, for the reason that the latter is a primary alcoholic radical and the former is a secondary alcoholic radical.

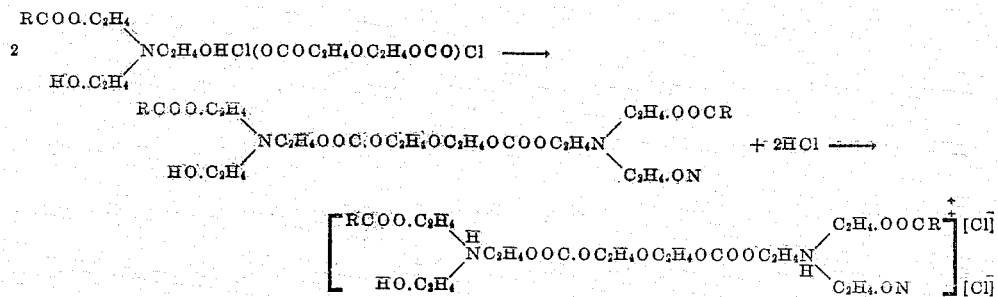

Materials of the kind herein specified are useful as wetting, detergent, and leveling agents in the laundry, textile and dyeing industries; as wetting agents and detergents in the acid washing of fruit, in the acid washing of building stone and brick; as a wetting agent and spreader in the application of asphalt in road building and the like; as a constituent of soldering flux preparations; as a flotation reagent in the flotation separation of various minerals; for flocculation and coagulation of various aqueous suspensions containing negatively charged particles, such as sewage, coal washing waste water, and various trade wastes; and the like; as germicides, insecticides, emulsifiers for cosmetics, spray oils, water-repellent textile finish, etc. These uses are by no means exhaustive. The most important phase of the present invention, as far as industrial application goes, is concerned with the use of the materials previously described as demulsifiers for water-in-oil emulsions, and more specifically, emulsions of water or brine in crude petroleum.

Having thus described our invention, what we claim and desire to secure by Letters Patent is:

1. A cation-active polychloride which is the reaction product of diglycol chloroformate and a hydroxylated monoacylated amine of the following formula:

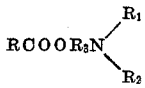

in which RCO is the acyl radical of a higher fatty acid having at least 8 and not more than 22 carbon atoms and $R_1$ and $R_2$ are selected from the monovalent radicals $$CH_3, \quad C_2H_5, \quad C_3H_7, \quad C_4H_9,$$
$$C_2H_4OH$$
$$C_2H_4OC_2H_4OH$$
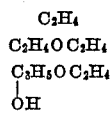

and $R_3$ is selected from the divalent radicals $$C_2H_4$$
$$C_2H_4OC_2H_4$$
$$\underset{\underset{OH}{|}}{C_2H_5OC_2H_4}$$

with the further proviso that there be at least one occurrence of an alcoholic hydroxyl radical in the radicals R, $R_1$, $R_2$, and $R_3$.

2. The product of claim 1, wherein the ratio of the hydroxylated mono-acylated amine to chloroformate is 2 to 1.

3. A product of the following formula:

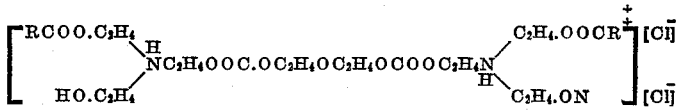

wherein RCO is the acyl radical of a higher fatty acid having at least 8 and not more than 22 carbon atoms.

4. The product of claim 3, wherein RCO is the acyl radical of an unsaturated fatty acid having 18 carbon atoms.

5. The product of claim 3, wherein RCO is a ricinoleyl radical.

6. The product of claim 3, wherein RCO is an oleyl radical.

7. The product of claim 3, wherein RCO is a linoleyl radical.

8. A method for obtaining a cation-active polychloride, characterized by reacting diglycol chloroformate with a hydroxylated mono-acylated amine of the following formula:

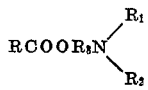

in which RCO is the acyl radical of a higher fatty acid having at least 8 and not more than 22 carbon atoms and $R_1$ and $R_2$ are selected from the monovalent radicals $$CH_3, \quad C_2H_5, \quad C_3H_7, \quad C_4H_9,$$
$$C_2H_4OH$$
$$C_2H_4OC_2H_4OH$$
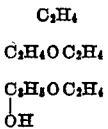

and $R_3$ is selected from the divalent radicals $$C_2H_4$$
$$C_2H_4OC_2H_4$$
$$\underset{\underset{OH}{|}}{C_2H_4OC_2H_4}$$

with the further proviso that there be at least one occurrence of an alcoholic hydroxyl radical in the radicals R, $R_1$, $R_2$, and $R_3$.

MELVIN DE GROOTE.
BERNHARD KEISER.

REFERENCES CITED

The following references are of record in the file of this patent:

UNITED STATES PATENTS

| Number | Name | Date |
|---|---|---|
| 2,468,180 | De Groote et al. | Apr. 26, 1949 |
| 2,468,181 | De Groote et al. | Apr. 26, 1949 |
| 2,472,573 | De Groote et al. | June 7, 1949 |